United States Patent
Goda et al.

(10) Patent No.: US 10,093,576 B2
(45) Date of Patent: Oct. 9, 2018

(54) UNSHAPED REFRACTORY MATERIAL

(71) Applicant: Krosakiharima Corporation, Fukuoka (JP)

(72) Inventors: Koji Goda, Fukuoka (JP); Yoshihiro Sasatani, Fukuoka (JP); Koichi Uemura, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 93 days.

(21) Appl. No.: 15/123,025

(22) PCT Filed: Mar. 3, 2014

(86) PCT No.: PCT/JP2014/055220
§ 371 (c)(1),
(2) Date: Sep. 1, 2016

(87) PCT Pub. No.: WO2015/132848
PCT Pub. Date: Sep. 11, 2015

(65) Prior Publication Data
US 2017/0081244 A1 Mar. 23, 2017

(51) Int. Cl.
*C04B 7/32* (2006.01)
*C04B 35/66* (2006.01)
*C04B 35/101* (2006.01)
*C04B 35/626* (2006.01)
*F27D 1/00* (2006.01)
*C04B 111/00* (2006.01)

(52) U.S. Cl.
CPC ............ *C04B 7/32* (2013.01); *C04B 35/1015* (2013.01); *C04B 35/62665* (2013.01); *C04B 35/66* (2013.01); *F27D 1/0006* (2013.01); C04B 2111/00215 (2013.01); C04B 2111/00431 (2013.01); C04B 2235/3206 (2013.01); C04B 2235/3208 (2013.01); C04B 2235/3222 (2013.01); C04B 2235/3418 (2013.01); C04B 2235/5427 (2013.01); C04B 2235/5436 (2013.01); C04B 2235/5445 (2013.01); C04B 2235/5472 (2013.01); C04B 2235/9669 (2013.01)

(58) Field of Classification Search
CPC ......... F27D 1/0006; C04B 7/32; C04B 35/66; C04B 35/1015; C04B 35/62665; C04B 2111/00215; C04B 2111/00431; C04B 2235/3206; C04B 2235/3208; C04B 2235/3222; C04B 2235/3418; C04B 2235/5427; C04B 2235/5436; C04B 2235/5445; C04B 2235/5472; C04B 2235/9669
See application file for complete search history.

(56) References Cited

U.S. PATENT DOCUMENTS 6,730,159 B1    5/2004   Falaschi

FOREIGN PATENT DOCUMENTS

| JP | 56-78461 | 6/1981 |
| JP | S56-78461 | 6/1981 |
| JP | 5-238838 | 9/1993 |
| JP | 8-198649 | 8/1996 |
| JP | 2002-537201 | 11/2002 |
| JP | 2014-47128 | 3/2014 |
| WO | 2007/129752 | 11/2007 |

OTHER PUBLICATIONS

Parr et al, Castables with Improved Corrosion Resistance for Steel-making Applications, 2011.
Wohrmeyer, New Spinel Containing Calcium Aluminate Cement for Corrosion Resistant Castables, 2011.
International Search Report dated May 16, 2014 for PCT/JP2014/055220.
Wöermeyer C., "Investigation of Ladle Castables That Contain a Novel Calcium Magnesium Aluminate Matrix, Refractories", dated Nov. 1, 2012, vol. 64, No. 11, 10 pages.
Makoto Ilyama, New Alumina Cement, Refractories, Set. 1, 2013, vol. 65, No. 9, p. 409-413.
English translation of International Preliminary Report on Patentability with Written Opinion dated Sep. 6, 2016 for PCT/JP2014/55220 (8 pages).

*Primary Examiner* — Anthony J Green
(74) *Attorney, Agent, or Firm* — Paul D. Bianco; Fleit Gibbons Gutman Bongini & Bianco PL

(57) ABSTRACT

In order to address the technical problem of allowing an unshaped refractory material using a spinel-containing alumina cement to provide further improved corrosion resistance and slag infiltration resistance while reducing the occurrence of crack/peeling, an unshaped refractory material is provided which comprises a refractory raw material mixture having a particle size of 8 mm or less, with the refractory raw material mixture having an alumina cement at least a part of which is a spinel-containing alumina cement, and, with respect to 100 mass % of the refractory raw material mixture, the alumina cement contains CaO in an amount of 0.5 to 2.5 mass %, and the spinel-containing alumina cement contains spinel in an amount of 3.5 to 10.5 mass %.

10 Claims, No Drawings

UNSHAPED REFRACTORY MATERIAL

TECHNICAL FIELD

The present invention relates to an unshaped refractory material to be used primarily for steelmaking process equipment.

BACKGROUND ART

In steelmaking process equipment, alumina-spinel based, alumina-magnesia based and alumina-spinel-magnesia based unshaped refractory materials as disclosed in the following Non-Patent Documents 1 and 2 are used as materials for a refractory construction to be subjected to a contact with molten steel and/or slag. As used in this specification, the term "spinel" means an $MgO-Al_2O_3$ based compound, more specifically, a compound having a stoichiometric composition of $MgO.Al_2O_3$, or a compound having a non-stoichiometric composition, in which MgO or $Al_2O_3$ is excessively incorporated as a solid solution.

The alumina-spinel based unshaped refractory material has a feature of providing high corrosion resistance against oxygen cleaning and steelmaking slag and high slag infiltration resistance, because spinel is capable of incorporating FeO therein as a solid solution, and further providing high hot strength, and high volume stability because of small residual expansion/shrinkage after heat receiving.

As for the alumina-magnesia based unshaped refractory material, when a refractory construction formed thereof is heated to 1100 to 1200° C. or more during steelmaking process, alumina and magnesia in the material read with each other to form fine spinel particles, and the fine spinel particles provide high corrosion resistance and slag infiltration resistance. Because finer spinel particles provide higher corrosion resistance and slag infiltration resistance, the alumina-magnesia based unshaped refractory material is generally better in terms of corrosion resistance and slag infiltration resistance, as compared, to the alumina-spinel based unshaped refractory material. However, the reaction causing the formation of fine spinel particles involves volume expansion, wherein expansion along with the formation of fine spinel particles occurs only on the side of an operating, surface of the refractory construction which is subjected to heating, thereby leading to a disadvantage that large peeling or crack occurs on the side of the operating surface. Thus, in terms of thermal spalling resistance, the alumina-magnesia based unshaped refractory material is generally inferior to the alumina-spinel based unshaped refractory material.

The alumina-spinel-magnesia based unshaped refractory material has both features of the alumina-spinel based and alumina-magnesia based unshaped refractory materials, and, in terms of volume stability, corrosion resistance and slag infiltration resistance, exhibits intermediate characteristics between the two unshaped refractory materials.

The following Patent Document 1 discloses an alumina-spinel based unshaped refractory material using fine spinel particles having a particle size of 5 μm or less. This is intended to improve corrosion resistance and slag infiltration resistance of a refractory construction formed of the alumina-spinel based unshaped refractory material, by initially incorporating thereinto fine spinel particles which are equivalent to fine spinel particles to be formed in a refractory construction formed of the alumina-magnesia based unshaped refractory material during steelmaking process.

Each of the Non-Patent Documents 1 and 2 and the following Patent Document 2 discloses an alumina-spinel based unshaped refractory material and an aluminum-spinel-magnesia based unshaped refractory material each using alumina cement containing spinel particles (hereinafter referred to as "spinel-containing alumina cement").

A commonly-used type of alumina cement comprises, as a primary component, $CaO.Al_2O_3$ or $CaO.2Al_2O_3$, and some types of alumina cements additionally contain $12CaO.7Al_2O_3$, $Al_2O_3$, etc. Each of $CaO.Al_2O_3$, $CaO.2Al_2O_3$ and $12CaO.7Al_2O_3$ exhibits a hydraulic properly, and is therefore used as a binder for an unshaped refractory material.

In an alumina-spinel based or alumina-spinel-magnesia based unshaped refractory material using such a commonly-used type of alumina cement, a portion of a refractory construction formed thereof adjacent to its operating surface during steelmaking process has a phase consisting primarily of $Al_2O_3$, spinel and $CaO.6Al_2O_3$, wherein a region other than the $Al_2O_3$ as an aggregate, called "matrix", is formed primarily of spinel and $CaO.6Al_2O_3$. When these two phases are finely and uniformly dispersed over the matrix, the refractory construction can exhibit high corrosion resistance and slag infiltration resistance.

The spinel-containing alumina cement disclosed in the Non-Patent Documents 1 and 2 is a cement over which fine spinel particles and $CaO.Al_2O_3$ and $CaO.2Al_2O_3$ particles are uniformly dispersed. Further, a refractory construction, formed of the alumina-spinel based or alumina-spinel-magnesia based unshaped refractory material using the spinel-containing alumina cement can exhibit high corrosion resistance and slag infiltration resistance, because spinel and $CaO.6Al_2O_3$ are formed in a matrix in a finely and uniformly dispersed manner.

CITATION LIST

Parent Document

Patent Document 1: JP05-238838A
Patent Document 2: 3P 08-198649A

Non-Patent Document

Non-Patent Document 1: Christoph Wohrmeyer et at.: New Spinel Containing Calcium Aluminate Cement for Corrosion Resistant Castable, Unitecr2011

Non-Patent Document 2: Chris Parr et al.: Castables with Improved Corrosion Resistance for Steel-making Applications, Unitecr2011

SUMMARY OF INVENTION

Technical Problem

Although the alumina-spinel based unshaped refractory material using the ultrafine spinel powder, as disclosed in the Patent Document 1, and the alumina-magnesia based and alumina-spinel-magnesia based unshaped refractory materials using the spinel-containing alumina cement, as disclosed in the Non-Patent Documents 1 and 2, are improved in terms of corrosion resistance and slag infiltration resistance, there remains a need for further improving durability in view of harshness of a steelmaking process and with a view to reduction in cost.

As to the alumina-spinel based unshaped refractory material using the ultrafine spinel powder, for obtaining desired properties, it is necessary to use a high-power mixing unit or kneading mixer so as to allow the ultrafine spinel powder to be uniformly mixed with and dispersed over an alumina cement.

On the other hand, as to the alumina-spinel based and alumina-spinel-magnesia based unshaped refractory materials using the spinel-containing alumina cement, it is possible to easily form a refractory construction in which spinel and $CaO.6Al_2O_3$ are finely and uniformly dispersed in the matrix. However, the fine and uniform dispersion facilitates sintering, possibly causing the occurrence of crack/peeling due to thermal spalling. Moreover, generally, a refractory construction formed with a higher degree of densification has a disadvantage that the crack/peeling due to thermal spalling is accelerated, although corrosion resistance and slag infiltration resistance thereof are improved.

Therefore, the present invention addresses a technical problem of allowing an unshaped refractory material using a spinel-containing alumina cement to provide further improved corrosion resistance and slag infiltration resistance while reducing the occurrence of crack/peeling. The present invention also addresses a technical problem of suppressing the occurrence of crack/peeling due to thermal spalling in a dense refractory construction formed of an unshaped refractory material, and reducing the occurrence of crack/peeling under use conditions including a harsh heating-cooling cycle.

Solution to Technical Problem

In order to solve the above technical problem, the present invention provides:
(1) an unshaped refractory material comprising a refractory raw material mixture having a particle size of 8 mm or less, wherein the refractory raw material mixture comprises an alumina cement at least a part of which consists of a spinel-containing alumina cement, wherein, with respect to 100 mass % of the refractory raw material mixture, the alumina cement contains CaO in an amount of 0.5 to 2.5 mass %, and the spinel-containing alumina cement contains spinel in an amount of 3.5 to 10.5 mass %.
(2) the unshaped refractory material described in Section (1), wherein the refractory raw material mixture further comprises a spinel raw material having a particle size of 0.1 mm or less, and wherein a total content of the spinel raw material and the spinel contained in the spinel-containing alumina cement is in the range of 5.5 to 22 mass %, with respect to 100 mass % of the refractory raw material mixture;
(3) the unshaped refractory material described in Section (1), wherein the refractory raw material mixture further comprises a magnesia raw material having a particle size of 0.1 mm or less, and wherein a content of the magnesia raw material is in the range of 2 to 9 mass %, with respect to 100 mass % of the refractory raw material mixture.
(4) the unshaped refractory material described in any one of Sections (1) to (3), wherein the refractory raw material mixture further comprises calcined alumina having a particle size of 3 μm or less, and wherein a content of the calcined alumina is 10 mass % or less, with respect to 100 mass % of the refractory raw material mixture;
(5) the unshaped refractory material described in any one of Sections (1) to (3), wherein the refractory raw material mixture further comprises calcined alumina having a particle size of 3 μm or less, and wherein a content of the calcined alumina is less than 4 mass %, with respect to 100 mass % of the refractory raw material mixture; and
(6) the unshaped refractory material described in any one of Sections (1) to (5), wherein the refractory raw material mixture further comprises at least one of an alumina raw material and a spinel raw material each having a particle size of greater than 0.1 mm to 8 mm, and wherein a total content of the at least one of the alumina raw material and the spinel raw material is in the range of 50 to 75 mass %, with respect to 100 mass % of the refractory raw material mixture.

Effect of Invention

The present invention makes it possible to optimize respective amounts of spinel and CaO to be added from a spinel-containing alumina cement to an unshaped refractory material, to thereby allow the unshaped refractory material to provide improved corrosion resistance and slag infiltration resistance while reducing the occurrence of crack/peeling due to thermal spalling.

DESCRIPTION OF EMBODIMENTS

The present invention, is applicable, primarily, to an alumina-spinel based unshaped refractory material and an alumina-spinel-magnesia based unshaped refractory material.

The alumina-spinel based unshaped refractory material according to the present invention primarily comprises a spinel-containing alumina cement, an alumina raw material, a spinel raw material, and a mineral admixture and a chemical admixture each used in commonly-used unshaped refractory materials. On the other hand, the alumina-spinel-magnesia based unshaped refractory material according to the present invention primarily comprises a spinel-containing alumina cement, an alumina raw material, a spinel raw material, a magnesia raw material, silica flour, and a mineral admixture and a chemical admixture each used in commonly-used unshaped refractory materials. It should be noted that the use of silica flour may be omitted, for example, when there is no problem with slaking of magnesia due to a hydration reaction with water vapor during drying, or when high priority is placed on hot strength.

As used in this specification, the term "refractory raw material mixture" means the entire refractory raw material mixture, except for the mineral admixture. In the present invention, the chemical admixture is included in the refractory raw material mixture, because, after all raw materials are mixed together to form an unshaped refractory material, the chemical admixture is hardly separated from a resulting raw material mixture.

Examples of the mineral admixture include an organic fiber, an Al powder and a metal fiber each used in commonly-used unshaped refractory materials. Examples of the chemical admixture include a water reducing agent, an AE agent, an antifoaming agent, a hardening adjuster, a fluidity adjuster, a magnesia-slaking inhibitor and an explosion inhibitor each used in commonly-used unshaped refractory materials.

The term "spinel-containing alumina cement" means a cement composed of a mixture consisting primarily of fine spinel particles, and $CaO.Al_2O_3$ particles and $CaO.2Al_2O_3$ particles each exhibiting a hydraulic property, like CMA 72 available from Kerneos Inc., wherein the cement may contain any other calcium, aluminate such as $12CaO.7Al_2O_3$ and $Al_2O_3$. The spinel-containing alumina cement may further contain: a component originating from impurities, such as $SiO_2$ or $Fe_2O_3$ a non-crystalline phase; a water reducing agent; and a chemical admixture for hardening adjustment.

In the unshaped refractory material of the present invention, it is possible to use an alumina cement at least a pair of which consists of the spinel-containing alumina cement, as needed basis. Specifically, in the present invention, the refractory raw material mixture having a particle size of 8 mm or less comprises an alumina cement at least a part of which consists of a spinel-containing alumina cement, wherein the alumina cement (a combination of the spinel-containing alumina cement and other type of alumina cement) contains CaO in an amount of 0.5 to 2.5 mass %, with respect to 100 mass % of the refractory raw material mixture. The spinel-containing alumina cement and other type of alumina cement mostly have a particle size of 0.1 mm or less; and make up a matrix in a microstructure of a refractory construction formed of the unshaped refractory material.

In the present invention, each of the CaO content, an aftermentioned spinel content and others is defined as a percentage with respect to 100 mass % of the refractory raw material mixture having a particle size of 8 mm or less. This is because corrosion resistance, slag infiltration resistance and strength of a refractory construction formed of the unshaped refractory material are largely influenced by a chemical composition and an alumina cement content in the refractory raw material mixture having a particle size of 8 mm or less.

Excluding impurity components, a chemical composition of an alumina-spinel based or alumina-spinel-magnesia based unshaped refractory material is $Al_2O_3$—MgO—CaO or $Al_2O_3$—MgO—CaO—$SiO_2$, wherein, as the CaO content becomes lower, a dissolution amount of CaO into steelmaking slag becomes smaller, thereby providing higher corrosion resistance. On the other hand, as a result of reaction with $Al_2O_3$ in a refractory construction formed of the unshaped refractory material, CaO in slag is captured in the refractory construction in the form of $CaO.6Al_2O_3$, and thereby slag being infiltrating is gradually increased in viscosity along with a decrease in a ratio $CaO/SiO_2$. Thus, when the CaO content in the unshaped refractory material is reduced, the viscosity of the slag being infiltrating is increased faster due to the decrease in the ratio $CaO/SiO_2$ at a leading edge of the slag being infiltrating, resulting in less slag infiltration.

As above, as the CaO content, i.e., a usage amount of the alumina cement, is reduced, the corrosion resistance and the slag infiltration resistance are improved. The same applies to conventional unshaped refractory materials. However, the conventional unshaped refractory materials have a disadvantage that a decrease in alumina cement content causes excessive deterioration in strength. By contrast, in the unshaped refractory material of the present invention, spinel, CaO $Al_2O_3$ and $CaO.2Al_2O_3$ originating from the spinel-containing alumina cement are finely and uniformly dispersed in the matrix of the refractory construction formed of the unshaped refractory material. This facilitates sintering, so that, even if the CaO content, i.e., the usage amount of the alumina cement, is reduced, the deterioration in strength is small.

The CaO content is set in the range of 0.5 to 2.5 mass %, because, if the alumina cement content is set such that the CaO content becomes less man 0.5 mass %, the strength is excessively lowered, and, on the other hand, if the alumina cement content is set such that the CaO content becomes greater than 2.5 mass %, the improvement in corrosion resistance and slag infiltration resistance cannot be obtained. As mentioned above, in the unshaped refractory material of the present invention, although the deterioration in strength is small even if the CaO content, i.e., the usage amount of the alumina cement, is reduced, the strength is excessively lowered if the CaO content becomes less than 0.5 mass %.

In the unshaped refractory material of the present invention, the spinel-containing alumina cement contains spinel in an amount of 3.5 to 10.5 mass %, with respect to 100 mass % of the refractory raw material mixture having a particle size of 8 mm or less. The spinel contained in the spinel-containing alumina cement is composed of fine spinel particles having a particle size of 0.1 mm or less, and uniformly dispersed together with $CaO.Al_2O_3$, $CaO.2Al_2O_3$ and others. If the spinel cement becomes less than 3.5 mass %, the effect of improving the corrosion resistance and slag infiltration resistance, as one object of the present invention, cannot be obtained. On the other hand, if the spinel contained in the spinel-containing alumina cement becomes greater than 10.5 mass %, crack/peeling is more likely to occur due to progress of sintering on the side of an operating surface of a refractory construction formed of the unshaped refractory material during steelmaking process.

In the unshaped refractory material of the present invention, with respect to 100 mass % of the refractory raw material mixture having a particle size of 8 mm or less, the alumina cement contains CaO in an amount of 0.5 to 2.5 mass %, and the spinel-containing alumina cement contains spinel in an amount of 3.5 to 10.5 mass %, wherein the refractory raw material mixture may further comprise a spinel raw material having a particle size of 0.1 mm or less, and wherein a total content of the spinel raw material and the spinel contained in the spinel-containing alumina cement is preferably in the range of 5.5 to 22 mass %. This adjustment makes it possible to obtain an unshaped refractory material capable of providing high corrosion resistance and slag infiltration resistance, high strength, and high thermal spalling resistance. Further, a spinel raw material having a particle size of greater than 0.1 mm may be used in combination to further improve the corrosion resistance and slag infiltration resistance.

In the unshaped refractory material of the present invention, with respect to 100 mass % of the refractory raw material mixture having a particle size of 8 mm or less, the alumina cement contains CaO in an amount of 0.5 to 2.5 mass %, and the spinel-containing alurnina cement contains spinel in an amount of 3.5 to 105 mass %, wherein the refractory raw material mixture may further comprise a magnesia raw material having a particle size of 0.1 mm or less, and wherein a content of the magnesia raw material is preferably in the range of 2 to 9 mass %. This adjustment makes it possible to obtain an unshaped refractory material capable of providing high corrosion resistance and slag infiltration resistance, high strength, and high thermal spalling resistance.

In the unshaped refractory material of the present invention, the refractory raw material mixture may further comprise calcined alumina having a particle size of 3 µm or less, wherein a content of the calcined alumina is preferably 10 mass % or less, with respect to 100 mass % of the refractory raw material mixture having a particle size of 8 mm or less. This adjustment makes it possible to obtain an unshaped refractory material capable of providing high corrosion resistance and slag filtration resistance, high strength, and high thermal spalling resistance. Particularly, in case of improving the thermal spalling resistance, a content of the calcined alumina having a particle size of 3 µm or less is preferably set to be less than 4 mass %, with respect to 100 mass % of the refractory raw material mixture having a particle size of 8 mm or less. A refractory construction obtained by using a high-performance water reducing agent and/or by applying strong vibration can be formed in a dense structure through kneading of an unshaped refractory material with a relatively small amount of water, so that the corrosion resistance and slag infiltration resistance are improved. On the other hand, sintering is facilitated, and thereby crack/peeling due to thermal spalling is more likely to occur. In this type of unshaped refractory material, the content of the calcined alumina having a particle size of 3 μm or less as a factor causing sintering may be set to be less than 4 mass %, so as to suppress the occurrence of crack/peeling, even in such a dense refractory construction. It is also possible to reduce crack/peeling which is likely to occur in a non-dense refractory construction under use conditions including an extremely harsh heating-cooling cycle. When the content of the calcined alumina having a particle size of 3 μm or less is set to be less than 4 mass %, a kneaded mixture with water can have poor fluidity. In this case, it is desirable to perform a filling process under strong vibration, instead of increasing an amount of kneading water.

In this case, the content of the calcined alumina having a particle size of 3 μm or less is set with respect to 100 mass % of the refractory raw material mixture having a particle size of 8 mm or less, in the following manner. Assuming that a rate of a fraction having a particle size of 3 μm or less, obtained by measuring a particle size distribution of calcined alumina, using a laser diffraction/scattering particle size distribution measuring device is A mass %, and a rate of the calcined alumina with respect to 100 mass % of the refractory raw material mixture having a particle size of 8 mm or less is B mass %, a content of the calcined alumina fraction having a particle size of 3 μm or less, with respect to 1.00 mass % of the refractory raw material mixture having a particle size of 8 mm or less, is calculated as A×B/100 mass %. When a plurality of refractory raw materials each containing calcined alumina are used, respective amounts of fractions having a particle size of 3 μm or less, among calcined aluminas contained in the refractory materials, may be added up.

In the unshaped refractory material of the present invention, a refractory raw material serving as an aggregate and having a particle size of greater than 0.1 mm to 8 mm may be composed, primarily, of at least one of an alumina raw material and a spinel raw material. Typically, a total content of the at least one of the alumina raw material and the spinel raw material each laving a particle size of greater than 0.1 mm to 8 mm is in the range of 50 to 75 mass %, with respect to 100 mass % of the refractory raw material mixture having a particle size of 8 mm or less.

Examples of refractory raw materials suitably usable in the unshaped refractory material of the present invention will be described below.

As the alumina raw material, it is possible to use a raw material produced by a fusion process or a sintering process and then subjected to grading (size adjustment), or a raw material produced by a Bayer process, called "calcined alumina". The alumina raw material produced by a fusion process or a sintering process and then subjected to grading may be a type containing $Al_2O_3$ in an amount of 90 mass % or more, preferably 99 mass % or more. The calcined alumina is also referred to as "reactive alumina".

As the spinel raw material, it is possible to use a raw material produced by a fusion process or a sintering process and then subjected to grading, as an $MgO-Al_2O_2$ based compound, more specifically, a compound having a stoichiometric composition of $MgO.Al_2O_3$, or a compound having a non-stoichiometric composition, in which MgO or $Al_2O_3$ is excessively incorporated as a solid solution.

As the magnesia raw material, it is possible to use a raw material produced by a fusion process or a sintering process and then subjected to grading. With a view to preventing the occurrence of crack due to volume expansion caused by slaking of the magnesia raw material during drying, it is desirable to use a magnesia raw material having high slaking resistance. Examples of the magnesia raw material having high slaking resistance include: a type containing, as impurities, CaO and $SiO_2$, wherein a ratio $CaO/SiO_2$ is relatively low; a type having no fracture surface; and a type subjected to surface coating.

During steelmaking process, the magnesia raw material reacts with the alumina raw material to form spinel. Thus, when a finer magnesia raw material is used, spinel is more finely formed to provide more improved corrosion resistance and slag infiltration resistance, and, on the other hand, when a coarser magnesia raw material is used, a speed of formation of spinel exhibiting volume expansion is reduced, and a refractory construction formed of the unshaped refractory material exhibits a sustained residual expansion characteristic to suppress the occurrence of crack.

The silica flour is a non-crystalline $SiO_2$-based raw material having a particle size of 1 μm or less, so-called "silica fume", "fumed silica", "microsilica", "volatile silica" or "silica dust", and is produced through in-air oxidation of SiO gas generated during production of Si, Fe—Si, $ZrO_2$ or the like. Preferably, in the alumina-spinel-magnesia based unshaped refractory material, the silica flour is contained in an amount of 2 mass % or less, with respect to 100 mass % of the refractory raw material mixture having a particle size of 8 mm or less, with a view to: preventing slaking of the magnesia raw material; reducing expansion along with formation of spinel; and giving a creep property to a refractory instruction formed thereof.

As the refractory material for the unshaped refractory material of the present invention, it is possible to use a raw material obtained by reusing a used refractory brick or unshaped refractory material, so-called "recycle raw material". As this recycle raw material, it is desirable to reuse a used alumina-spinel based, alumina-magnesia based, or alumina-spinel-magnesia based refractory brick or unshaped refractory material.

In the unshaped refractory material of the present invention, with a view to preventing extension of crack to reduce the occurrence of crack/peeling, or improving corrosion resistance based on dense and large aggregates, a refractory raw material having a particle size of greater than 8 mm may also be used. However, in the present invention, each of the CaO content, the spinel content and others is defined as a percentage with respect to 100 mass % of the refractory raw material mixture having a particle size of 8 mm or less, for the aforementioned reason.

In the unshaped refractory material of the present invention, as other refractory raw materials, it is possible to use zirconia, mullite, zirconia-alumina, chromia, or the like. In this case, it is desirable to use these refractory raw materials in an amount of 10 mass % or less, with respect to 100 mass % of the refractory raw material mixture having a particle size of 8 mm or less.

The unshaped refractory material of the present invention described above is suitably usable in a casting installation process or a wet-spraying installation process.

EXAMPLES

Table 1 presents respective raw material compositions of Inventive Examples 1 to 21 and Comparative Examples 1 to 5. Table 2 presents respective raw material compositions of Inventive Examples 22 to 40 and Comparative Examples 6 to 9.

|  |  | Inventive Example ||||||||||||| 
|---|---|---|---|---|---|---|---|---|---|---|---|---|---|---|
|  |  | 1 | 2 | 3 | 4 | 5 | 6 | 7 | 8 | 8 | 9 | 10 | 11 | 12 | 13 |
| Refractory Raw Material | Sintered alumina 8-0.1 mm | 52.9 | 53.9 | 54.9 | 54.9 | 54.9 | 56.9 | 57.9 | 56.9 | 54.9 | 52.9 | 50.9 | 49.9 | 64.9 | 64.9 |
|  | Sintered spinel 8-0.1 mm |  |  |  |  |  |  |  |  |  |  |  |  |  |  |
|  | Sintered alumina 0.1 mm or less | 9 | 7 | 7 | 5 | 5 | 5 | 12 | 12 | 5 | 5 | 7 | 7 | 10.5 | 15 |
|  | Calcined alumina A | 7 | 7 | 7 | 7 | 5 | 7 | 8 | 7 | 5 | 3 | 2 | 7 | 7 | 3 |
|  | Calcined alumina B | 6 | 6 | 6 | 6 | 5 | 6 | 6 | 6 | 4 | 4 | 4 | 6 | 6 | 4 |
|  | Sintered spinel 1-0.3 mm | 10 | 10 | 10 | 10 | 10 | 10 | 10 | 10 | 10 | 10 | 10 | 10 |  |  |
|  | Sintered spinel 0.1 mm or less | 10 | 9 | 5 | 5 | 5 |  |  |  | 10 | 15 | 16 | 5 | 5 |  |
|  | Sintered magnesia 1-0.3 mm |  |  |  |  |  |  |  |  |  |  |  | 5 |  |  |
|  | Sintered magnesia 0.1 mm or less |  |  |  |  |  |  |  |  |  |  |  |  | 1 | 2.5 |
|  | Silica flour |  |  |  |  |  |  |  |  |  |  |  |  | 0.5 | 0.5 |
|  | Spinel-containing alumina cement | 5 | 5.5 | 10 | 8 | 10 | 15 | 6 | 8 | 11 | 10 | 10 | 10 | 5 | 10 |
|  | Spinel-free alumina cement |  | 1.5 |  | 4 | 5 |  |  |  |  |  |  |  |  |  |
|  | Sodium polyacrylate | 0.1 | 0.1 | 0.1 | 0.1 | 0.1 | 0.1 | 0.1 | 0.1 | 0.1 | 0.1 | 0.1 | 0.1 | 0.1 | 0.1 |
| CaO in cement |  | 0.5 | 1.0 | 1.0 | 2.0 | 2.5 | 1.5 | 0.6 | 0.8 | 1.1 | 1.0 | 1.0 | 1.0 | 0.5 | 1.0 |
| Spinel in spinel-containing alumina cement |  | 3.5 | 3.9 | 7.0 | 5.6 | 7.0 | 10.5 | 4.2 | 5.6 | 7.7 | 7.0 | 7.0 | 7.0 | 3.5 | 7.0 |
| Spinel having particle size of 0.1 mm or less |  | 13.5 | 12.9 | 12.0 | 10.6 | 12.0 | 10.5 | 4.2 | 5.6 | 17.7 | 22.0 | 23.0 | 12.0 | 8.5 | 7.0 |
| Magnesia having particle size of 0.1 mm or less |  | 0.0 | 0.0 | 0.0 | 0.0 | 0.0 | 0.0 | 0.0 | 0.0 | 0.0 | 0.0 | 0.0 | 0.0 | 1.0 | 2.5 |
| Calcined alumina having particle size of 3 μm or less |  | 6.9 | 6.9 | 6.9 | 6.9 | 5.6 | 6.9 | 7.1 | 6.9 | 4.7 | 4.3 | 4.1 | 6.9 | 6.9 | 4.3 |
| Evaluation | Depth of Wear | A | A | A | B | B | B | B | A | A | B | A | B | B | B |
|  | Depth of slag infiltration | A | A | A | B | B | A | B | B | B | B | B | A | B | B |
|  | Bending strength | B | A | A | A | A | A | B | A | A | A | A | A | B | A |
|  | Thermal spalling resistance | B | A | A | B | B | B | A | A | B | B | A | B | A |
|  | Comprehensive Evaluation | A | A+ | A+ | A | B | A | B | A | A | B | B | A+ | B | A |

|  |  | Inventive Example |||||||| Comparative Example |||||
|---|---|---|---|---|---|---|---|---|---|---|---|---|---|---|
|  |  | 14 | 15 | 16 | 17 | 18 | 19 | 20 | 21 | 1 | 2 | 3 | 4 | 5 |
| Refractory Raw Material | Sintered alumina 8-0.1 mm | 64.9 | 64.9 | 64.9 | 54.9 | 54.9 | 61.9 | 46.9 |  | 54.9 | 54.9 | 54.9 | 54.9 | 54.9 |
|  | Sintered spinel 8-0.1 mm |  |  |  |  |  |  |  | 64.9 |  |  |  |  |  |
|  | Sintered alumina 0.1 mm or less | 6 | 3 | 6 | 7 | 14 |  | 16 | 7 | 12 | 13 | 3 | 3 | 3 |
|  | Calcined alumina A | 7 | 6 | 8 | 4 | 2 | 7 | 5 | 7 | 7 | 7 | 6 | 9 | 7 |
|  | Calcined alumina B | 5.5 | 6 | 5 | 9 | 11 | 6 | 4 | 6 | 6 | 6 | 5 | 6 | 5 |
|  | Sintered spinel 1-0.3 mm |  |  |  | 10 | 10 | 10 | 10 |  | 10 | 10 | 10 | 10 | 10 |
|  | Sintered spinel 0.1 mm or less |  |  |  | 5 |  | 5 | 8 | 5 | 5 | 5 | 5 |  |  |
|  | Sintered magnesia 1-0.3 mm |  |  |  |  |  |  |  |  |  |  |  |  |  |
|  | Sintered magnesia 0.1 mm or less | 6 | 9 | 10 |  |  |  |  |  |  |  |  |  |  |
|  | Silica flour | 0.5 | 1 | 1 |  |  |  |  |  |  |  |  |  |  |
|  | Spinel-containing alumina cement | 10 | 10 | 5 | 10 | 8 | 10 | 10 | 10 |  | 4 | 10 | 17 | 16 |
|  | Spinel-free alumina cement |  |  |  |  |  |  |  |  | 5 |  | 6 |  | 4 |
|  | Sodium polyacrylate | 0.1 | 0.1 | 0.1 | 0.1 | 0.1 | 0.1 | 0.1 | 0.1 | 0.1 | 0.1 | 0.1 | 0.1 | 0.1 |
| CaO in cement |  | 1.0 | 1.0 | 0.5 | 1.0 | 0.8 | 1.0 | 1.0 | 1.0 | 1.5 | 0.4 | 2.8 | 1.7 | 2.8 |
| Spinel in spinel-containing alumina cement |  | 7.0 | 7.0 | 3.5 | 7.0 | 5.6 | 7.0 | 7.0 | 7.0 | 0.0 | 2.8 | 7.0 | 11.9 | 11.2 |
| Spinel having particle size of 0.1 mm or less |  | 7.0 | 7.0 | 3.5 | 12.0 | 5.6 | 12.0 | 15.0 | 12.0 | 5.0 | 7.8 | 12.0 | 11.9 | 11.2 |
| Magnesia having particle size of 0.1 mm or less |  | 6.0 | 9.0 | 10.0 | 0.0 | 0.0 | 0.0 | 0.0 | 0.0 | 0.0 | 0.0 | 0.0 | 0.0 | 0.0 |
| Calcined alumina having particle size of 3 μm or less |  | 6.4 | 6.7 | 6.1 | 9.2 | 10.7 | 6.9 | 4.7 | 6.9 | 6.9 | 6.9 | 5.8 | 7.3 | 6.0 |
| Evaluation | Depth of Wear | A | A | A | A | B | A | A | A | C | B | C | B | C |
|  | Depth of slag infiltration | A | B | B | A | B | B | A | A | C | B | B | C | C |
|  | Bending strength | A | A | A | A | A | A | A | A | C | A | A | A |
|  | Thermal spalling resistance | B | A | A | B | A | B | A | A | B | A | C | C |
|  | Comprehensive Evaluation | A | A | B | A | B | A | A | A+ | C | C | C | C | C |

TABLE 2

| | | Inventive Example | | | | | | | | | | | | |
|---|---|---|---|---|---|---|---|---|---|---|---|---|---|
| | | 22 | 23 | 24 | 25 | 26 | 27 | 28 | 29 | 30 | 31 | 32 | 33 | 34 |
| Refractory Raw Material | Fused alumina 8-0.1 mm | 54.9 | 54.9 | 54.9 | 54.9 | 54.9 | 54.9 | 54.9 | 54.9 | 54.9 | 54.9 | 54.9 | 54.9 | 51.9 |
| | Fused alumina 0.1 mm or less | 22 | 14 | 12 | 9 | 14 | 14 | 22 | 23 | 21 | 9 | 4 | | 14 |
| | Calcined alumina A | | 3 | 3 | 3 | 3 | 8 | | 3 | 3 | 3 | 3 | 4 | 3 |
| | Calcined alumina B | 3 | 3 | 3 | 3 | 3 | | 3 | 3 | 3 | 3 | 3 | 3 | 3 |
| | Sintered spinel 1-0.3 mm | 10 | 10 | 10 | 10 | 10 | 10 | 10 | 10 | 10 | 10 | 10 | 10 | 10 |
| | Sintered spinel 0.1 mm or less | 5 | 5 | 5 | 5 | | 5 | 5 | | | 10 | 13 | 13 | 5 |
| | Sintered magnesia 1-0.3 mm | | | | | | | | | | | | | 3 |
| | Sintered magnesia 0.1 mm or less | | | | | | | | | | | | | |
| | Silica flour | | | | | | | | | | | | | |
| | Spinel-containing alumina cement | 5 | 10 | 8 | 10 | 15 | 8 | 8 | 6 | 8 | 10 | 12 | 15 | 10 |
| | Spinel-free alumina cement | | | | | | | | | | | | | |
| | Sodium polycarboxylate | 0.1 | 0.1 | 0.1 | 0.1 | 0.1 | 0.1 | 0.1 | 0.1 | 0.1 | 0.1 | 0.1 | 0.1 | 0.1 |
| CaO in cement | | 0.5 | 0.1 | 2.0 | 2.5 | 1.5 | 0.8 | 0.8 | 0.6 | 0.8 | 1.0 | 1.2 | 1.5 | 1.0 |
| Spinel in spinel-containing alumina cement | | 3.5 | 7.0 | 5.6 | 7.0 | 10.5 | 5.6 | 5.6 | 4.2 | 5.6 | 7.0 | 8.4 | 10.5 | 7.0 |
| Spinel having particle size of 0.1 mm or less | | 8.5 | 12.0 | 10.6 | 12.0 | 10.5 | 10.6 | 10.6 | 4.2 | 5.6 | 17.0 | 21.4 | 23.5 | 12.0 |
| Magnesia having particle size of 0.1 mm or less | | 0.0 | 0.0 | 0.0 | 0.0 | 0.0 | 0.0 | 0.0 | 0.0 | 0.0 | 0.0 | 0.0 | 0.0 | 0.0 |
| Calcined alumina having particle size of 3 μm or less | | 2.8 | 3.4 | 3.4 | 3.4 | 3.4 | 1.5 | 0.0 | 3.4 | 3.4 | 3.4 | 3.4 | 3.5 | 3.4 |
| Evaluation | Depth of Wear | A | A | B | B | B | A | A | B | B | A | A | B | A |
| | Depth of slag infiltration | B | A | B | B | B | B | B | B | B | B | B | B | A |
| | Bending strength | B | A | A | A | A | B | B | B | A | A | A | A | A |
| | Thermal spalling resistance | A | A | A | A | B | A | A | A | A | A | A | B | A |
| | Comprehensive Evaluation | A | A+ | A | A | A | A | A | B | A | A | A | B | A+ |

| | | Inventive Example | | | | | | Comparative Example | | | |
|---|---|---|---|---|---|---|---|---|---|---|---|
| | | 35 | 36 | 37 | 38 | 39 | 40 | 6 | 7 | 8 | 9 |
| Refractory Raw Material | Fused alumina 8-0.1 mm | 64.9 | 64.9 | 64.9 | 64.9 | 64.9 | 52.9 | 54.9 | 54.9 | 54.9 | 54.9 |
| | Fused alumina 0.1 mm or less | 17.5 | 16 | 12.5 | 12 | 10 | 12 | 19 | 20 | 8 | |
| | Calcined alumina A | 3 | 3 | 3 | 3 | 3 | 4 | 3 | 3 | 3 | 9 |
| | Calcined alumina B | 3 | 3 | 3 | 3 | 3 | 4 | 3 | 3 | 3 | |
| | Sintered spinel 1-0.3 mm | | | | | | 10 | 10 | 10 | 10 | 10 |
| | Sintered spinel 0.1 mm or less | 5 | | | | | 5 | 5 | 5 | 5 | 9 |
| | Sintered magnesia 1-0.3 mm | | | | | | | | | | |
| | Sintered magnesia 0.1 mm or less | 1 | 2.5 | 6 | 8 | 10 | | | | | |
| | Silica flour | 0.5 | 0.5 | 0.5 | 1 | 1 | | | | | |
| | Spinel-containing alumina cement | 5 | 10 | 10 | 8 | 8 | 8 | | 4 | 10 | 17 |
| | Spinel-free alumina cement | | | | | | 4 | 5 | | 6 | |
| | Sodium polycarboxylate | 0.1 | 0.1 | 0.1 | 0.1 | 0.1 | 0.1 | 0.1 | 0.1 | 0.1 | 0.1 |
| CaO in cement | | 0.5 | 1.0 | 1.0 | 0.8 | 0.8 | 2.0 | 1.5 | 0.4 | 2.8 | 1.7 |
| Spinel in spinel-containing alumina cement | | 3.5 | 7.0 | 7.0 | 5.6 | 5.6 | 5.6 | 0.0 | 2.8 | 7.0 | 11.9 |
| Spinel having particle size of 0.1 mm or less | | 8.5 | 7.0 | 7.0 | 5.6 | 5.6 | 10.6 | 5.0 | 7.8 | 12.0 | 20.9 |
| Magnesia having particle size of 0.1 mm or less | | 1.0 | 2.5 | 6.0 | 8.0 | 10.0 | 0.0 | 0.0 | 0.0 | 0.0 | 0.0 |
| Calcined alumina having particle size of 3 μm or less | | 3.4 | 3.4 | 3.4 | 3.4 | 3.4 | 4.5 | 3.4 | 3.4 | 3.4 | 1.6 |
| Evaluation | Depth of Wear | B | B | A | A | A | B | C | B | C | B |
| | Depth of slag infiltration | B | B | A | B | B | B | C | B | B | C |
| | Bending strength | B | B | B | B | B | A | A | C | A | A |
| | Thermal spalling resistance | A | A | A | A | B | B | A | A | A | B |
| | Comprehensive Evaluation | B | A | A+ | A | B | B | C | C | C | C |

Refractory raw materials used in the Examples were: two types of sintered aluminas having an $Al_2O_3$ purity of 99.3 to 99.7 mass % wherein one of the sintered aluminas has a particle size of 8 to 0.1 mm, and the other sintered alumina has a particle size of 0.1 mm or less; two types of fused aluminas having an $Al_2O_3$ purity of 99.2 to 99.7 mass %, wherein one of the fused aluminas has a particle size of 8 to 0.1 mm, and the other fused alumina has a particle size of 0.1 mm or less, sintered spinel containing MgO in an amount of 4 to 6 mass % and having a particle size of 8 to 0.1 mm; two types of sintered spinels containing MgO in an amount of 26 to 28 mass %, wherein one of the sintered spinels has a particle size of 1 to 0.3 mm, and the other sintered spinel has a particle size of 0.1 mm or less; calcined alumina A in which a content of a fraction having a particle size of 3 μm or less is 18.2 mass %; calcined alumina B in which a content of a fraction having a particle size of 3 μm or less is 93.6 mass %; two types of sintered magnesia having a MgO purity of 95.0 to 95.5 mass %, wherein one of the sintered magnesia has a particle size of 1 to 0.3 mm, and the other sintered magnesia has a particle size of 0.1 mm or less; and silica flour containing SiO2 in an amount of 98.4 mass % and having an average particle size of 0.2 μm. In addition, CMA 72 and SECAR 71 produced by Kermes Inc., were employed, respectively, as a spinel-containing alumina cement and a spinel-free alumina cement which are refractory materials used in the Examples. In each of CMA72 and SECAR71, a portion of 99 mass % had a particle size of 0.1 mm or less. Further, as a water reducing agent, sodium polyacrylate or sodium polyauboxylate was used in an amount of 0.1 mass %. A total amount of the above refractory raw materials including the water reducing agent (refractory raw material mixture) is 100 mass %.

In Tables 1 and 2, the item "CaO in cement" presents a total amount of CaO contained in the spinel-containing alumina cement (CMA72) and the spinel-free alumina cement (SECAR71), in units of mass % with respect to 100 mass % of the refractory raw material mixture. The item "Spinel in spinel-containing alumina cement" presents an amount of spinel contained in the spinel-containing alumina cement, in units of mass % with respect to 100 mass % of the refractory raw material mixture. The item "Spinel having particle size of 0.1 mm or less" presents a total content of the spinel raw material (sintered spinel) having a particle size of 0.1 mm or less and spinel contained in the spinel-containing alumina cement, in units of mass % with respect to 100 mass % of the refractory raw material mixture. The item "Magnesia having particle size of 0.1 mm or less" presents a content of the magnesia raw material (sintered magnesia) having a particle size of 0.1 mm or less, in units of mass % with respect to 100 mass % of the refractory raw material mixture.

As used herein, the term "a fraction having a particle size of 0.1 mm or less" means an undersize fraction obtained using a sieve having a mesh opening of 0.100 mm.

In Tables 1 and 2, the item "Calcined alumina having 3 μm or less" presents a content of the calcined alumina having a particle size of 3 μm or less, in units of mass % with respect to 100 mass % of the refractory raw material mixture. In this regard, a particle size distribution of each of the calcined alumina A and the calcined alumina B was measured using a laser diffraction/scattering particle size distribution measuring device, to obtain an amount of a fraction having a particle size of 3 μm or less in each of the calcined alumina A and the calcined alumina B, and then, based this measurement result and respective usage amounts of the calcined alumina A and the calcined alumina B, a value of the content of the calcined alumina having a particle size of 3 μm or less was calculated.

Test pieces of unshaped refractory materials having respective raw material compositions in Tables 1 and 2 were produced, and subjected to evaluations on depth of wear, depth of slag infiltration, bending strength, and thermal spalling resistance. Specifically, each of the raw material mixtures in Tables 1 and 2 was kneaded with a given amount of water suitable for casting, and the resulting kneaded mixture was cast into a frame. Then, the cast mixture was sufficiently degassed by applying, to the frame, vibration with a vibrational acceleration of 2G for the test pieces pertaining to Table 1, and vibration with a vibrational acceleration of 4G for the test pieces pertaining to Table 2, and the degassed mixture was cured for 24 hours to obtain a corresponding one of the test pieces.

As for the depth of wear, each of the test pieces pertaining to Table 1 was subjected to an in-slag rotation corrosion test at 1650° C. for 10 hours, using converter slag, and each of the test pieces pertaining to Table 2 was subjected to an in-slag rotation corrosion test at 1700° C. for 8 hours, using converter slag. As a result, when the depth of wear was 7 mm or less, in the range of greater than 7 mm to 10 mm, and greater than 10 mm, the test piece was evaluated, respectively, as A, B and C. The depth of wear is one index of corrosion resistance.

As for the depth of slag infiltration, in the in-slag rotation corrosion test for measuring the depth of wear, when the depth of slag infiltration was 2 mm or less, in the range of greater than 2 mm to 4 mm, and greater than 4 mm, the test piece was evaluated, respectively, as A, B and C.

As for the bending strength, each test piece having a size of 40×40×160 mm was cured in the above manner, and then, after removing the frame, subjected to drying at 110° C. for 24 hours, burning at 1200° C. for 3 hours, and then measurement on bending strength. When the measured value was 15 MPa or more, in the range of less than 15 MPa to 10 MPa, and 10 MPa or less, the test piece was evaluated, respectively, as A, B and C.

As for thermal spalling resistance, each test piece having a size of 230×114×65 mm was cured in the above manner, and then, after removing the frame, subjected to drying at 110° C. for 24 hours, heat treatment at 350° C. for 6 hours. The obtained test piece was repeatedly subjected to a heating-cooling cycle, and then a crack occurrence state was observed. More specifically, an operation of heating a surface of the test piece having a size of 114×65 mm for 30 minutes by using an electric furnace heated to 1400° C., and then cooling the test piece for 30 minutes was repeated 5 times. As a result, when the occurrence of crack was negligible, the test piece was evaluated as A. When a certain degree of crack occurred, the test piece was evaluated as B, and when a large crack occurred, the test piece was evaluated as C.

As for the comprehensive evaluation, when all of the items "depth of wear", "depth of slag infiltration", "bending strength" and "thermal spalling resistance" were evaluated as A, the test piece was comprehensively evaluated as A$^+$. Except for this case, when two or more of the items was evaluated as A and the remaining items were not evaluated as C, the test piece was comprehensibly evaluated as A. Except for the above cases, when no item was evaluated as C, the test piece was comprehensively evaluated as B, and, when at least one item was evaluated as C, the test piece was comprehensively evaluated as C. The evaluation becomes worse in order of A$^+$, A, B and C.

In Examples 1 to 21 in Table 1 which are Inventive Examples, none of the items "depth of wear", "depth of slag infiltration", "bending strength" and "thermal spalling resistance" is evaluated as C. This shows that it is possible to obtain an unshaped refractory material capable of providing high corrosion resistance and slag infiltration resistance, high strength and high thermal spalling resistance.

Among Inventive Examples 1 to 21, Inventive Examples 7 and 10 in which the content of "spinel having a particle size of 0.1 mm or less" is out of the preferred range (5.5 to 22 mass %), Inventive Examples 12 and 16 using the magnesia raw material, in which the content of "magnesia having a particle size of 0.1 μm or less" is out of the preferred range (2 to 9 mass %), and Inventive Example 18 in which the content of "calcined alumina having a particle size of 3 μm or less" is out of the preferred range (10 mass % or less), tend to be inferior to the remaining Inventive Examples in terms of results of the respective evaluations, but none of the items is evaluated as C. This shows that it is possible to obtain an unshaped refractory material capable of providing high corrosion resistance and slag infiltration resistance, high strength and high thermal spalling resistance, as compared to aftermentioned Comparative Examples.

In Table 1, Comparative Example 1 is an example where the spinel-containing alumina cement is not used. It has poor corrosion resistance, and large slag infiltration Comparative Example 2 is an example where each of the content of CaO in the alumina cement and the content of spinel in the spinel-containing alumina cement is below the range set forth in the appended claims. It has poor strength.

Comparative Example 3 is an example where the content of CaO in the alumina cement is above the range set forth in the appended claims. It has poor corrosion resistance.

Comparative Example 4 is an example where the content of spinel in the spinel-containing alumina cement is above the range set forth in the appended claims. It has large slag infiltration and poor thermal spalling resistance.

Comparative Example 5 is an example where each of the content of CaO in the alumina cement and the content of spinel in the spinel-containing alumina cement is above the range set forth in the appended claims. It has poor corrosion resistance, large slag infiltration, and poor thermal spalling resistance.

Inventive Examples and Comparative Examples in Table 2 are examples where, by using a high-performance water reducing agent and molding an unshaped refractory material while applying vibration having vibrational acceleration of 4G, a dense refractory construction is produced through kneading of the unshaped refractory material with a relatively small amount of water.

In Examples 22 to 40 which are Inventive Examples, none of the items "depth of wear", "depth of slag infiltration", "bending strength" and "thermal spalling resistance" is evaluated as C. This shows that it is possible to obtain an unshaped refractory material capable of providing high corrosion resistance and slag infiltration resistance, high strength and high thermal spalling resistance. Among inventive Examples 22 to 40, Inventive Examples 29 and 33 in which the content of "spinel having a particle size of 0.1 mm or less" is out of the preferred range (5.5 to 22 mass %), Inventive Examples 35 and 39 using the magnesia raw material, in which the content of "magnesia having a particle size of 0.1 mm or less" is out of the preferred range (2 to 9 mass %), and Inventive Example 40 in which the content of "calcined alumina having a particle size of 3 μm or less" is out of the preferred range (4 mass % or less), tend to be inferior to the remaining Inventive Examples in terms of results of the respective evaluations, but none of the items is evaluated as C. This shows that it is possible to obtain an unshaped refractory material capable of providing high corrosion resistance and slag infiltration resistance, high strength and high thermal spalling resistance, as compared to Comparative Examples.

In Table 2, Comparative Example 6 is an example where the spinel-containing alumina cement is not used. It has poor corrosion resistance, and large slag infiltration.

Comparative Example 7 is an example where each of the content of CaO in the alumina cement and the content of spinel in the spinel-containing alumina cement is below the range set forth in the appended claims. It has poor strength.

Comparative Example 8 is an example where the content of CaO in the alumina cement is above the range set forth in the appended claims. It has poor corrosion resistance.

Comparative Example 9 is an example where the content of spinel in the spinel-containing alumina cement is above the range set forth in the appended claims, it has large slag infiltration.

The invention claimed is:

1. An unshaped refractory material including a refractory raw material mixture having a particle size of 8 mm or less, the refractory raw material mixture comprising:
   an alumina cement, at least a part of which is a spinel-containing alumina cement, wherein, with respect to 100 mass % of the refractory raw material mixture, the alumina cement contains CaO in an amount of 0.5 to 2.5 mass %, and the spinel-containing alumina cement contains spinel in an amount of 3.5 to 10.5 mass %; and
   a spinel raw material having a particle size of 0.1 mm or less, wherein, with respect to 100% mass of the refractory raw material mixture, a total content of the spinal raw material and the spinel contained in the spinel-containing alumina cement is in a range of 5.5 to 22 mass %.

2. The unshaped refractory material of claim 1, wherein the refractory raw material mixture further comprises calcined alumina having a particle size of 3 μm or less, wherein, with respect to 100 mass % of the refractory raw material mixture, a content of the calcined alumina is 10 mass % or less.

3. The unshaped refractory material of claim 1, wherein the refractory raw material mixture further comprises calcined alumina having a particle size of 3 μm or less, wherein, with respect to 100 mass % of the refractory raw material mixture, a content of the calcined alumina is less than 4 mass %.

4. The unshaped refractory material of claim 1, wherein the refractory raw material mixture further comprises at least one of an alumina raw material and a spinel raw material, each having a particle size of greater than 0.1 mm to 8 mm, wherein, with respect to 100 mass % of the refractory raw material mixture, a total content of the at least one alumina raw material and the spinel raw material is in a range of 50 to 75 mass %.

5. The unshaped refractory material of claim 2, wherein the refractory raw material mixture further comprises at least one of an alumina raw material and a spinel raw material, each having a particle size of greater than 0.1 mm to 8 mm, wherein, with respect to 100 mass % of the refractory raw material mixture, a total content of the at least one alumina raw material and the spinel raw material is in a range of 50 to 75 mass %.

6. The unshaped refractory material of claim 3, wherein the refractory raw material mixture further comprises at least one of an alumina raw material and a spinel raw material, each having a particle size of greater than 0.1 mm to 8 mm, wherein, with respect to 100 mass % of the refractory raw material mixture, a total content of the at least one alumina raw material and the spinel raw material is in a range of 50 to 75 mass %.

7. An unshaped refractory material including a refractory raw material mixture having a particle size of 8 mm or less, the refractory raw material mixture comprising:

an alumina cement, at least a part of which is a spinel-containing alumina cement, wherein, with respect to 100 mass % of the refractory raw material mixture, the alumina cement contains CaO in an amount of 0.5 to 2.5 mass %, and the spinel-containing alumina cement contains spinel in an amount of 3.5 to 10.5 mass %; and a magnesia raw material having a particle size of 0.1 mm or less, wherein, with respect to 100 mass % of the refractory raw material mixture, a content of the magnesia raw material is in a range of 2 to 9 mass %.

8. The unshaped refractory material of claim 7, wherein the refractory raw material mixture further comprises calcined alumina having a particle size of 3 μm or less, wherein, with respect to 100 mass % of the refractory raw material mixture, a content of the calcined alumina is 10 mass % or less.

9. The unshaped refractory material of claim 7, wherein the refractory raw material mixture further comprises calcined alumina having a particle size of 3 μm or less, wherein, with respect to 100 mass % of the refractory raw material mixture, a content of the calcined alumina is less than 4 mass %.

10. The unshaped refractory material of claim 7, wherein the refractory raw material mixture further comprises at least one of an alumina raw material and a spinel raw material, each having a particle size of greater than 0.1 mm to 8 mm, wherein, with respect to 100 mass % of the refractory raw material mixture, a total content of the at least one alumina raw material and the spinel raw material is in a range of 50 to 75 mass %.

* * * * *